US009397858B2

(12) United States Patent
K. S. et al.

(10) Patent No.: US 9,397,858 B2
(45) Date of Patent: Jul. 19, 2016

(54) DETECTING VLAN REGISTRATION PROTOCOL CAPABILITY OF A SWITCH IN A COMPUTER NETWORK

(75) Inventors: Sudarshana K. S., Karnataka (IN); Vinutha Mohan Rao, Karnataka (IN); M. Radhakrishna Rao, Karnataka (IN); Norman Finn, Livermore, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 522 days.

(21) Appl. No.: 13/596,997

(22) Filed: Aug. 28, 2012

(65) Prior Publication Data
US 2014/0064286 A1    Mar. 6, 2014

(51) Int. Cl.
*H04L 12/46* (2006.01)

(52) U.S. Cl.
CPC ......... *H04L 12/4679* (2013.01); *H04L 12/4687* (2013.01); *H04L 12/4695* (2013.01); *Y02B 60/43* (2013.01)

(58) Field of Classification Search
None
See application file for complete search history.

(56) References Cited

U.S. PATENT DOCUMENTS

| | | | |
|---|---|---|---|
| 7,877,483 B1 * | 1/2011 | Finn | 709/227 |
| 8,036,106 B1 * | 10/2011 | Hu et al. | 370/218 |
| 8,204,061 B1 * | 6/2012 | Sane et al. | 370/397 |
| 8,325,630 B2 * | 12/2012 | Khan et al. | 370/256 |
| 2006/0245436 A1 * | 11/2006 | Sajassi | 370/395.53 |
| 2010/0020795 A1 * | 1/2010 | Devarajan et al. | 370/389 |
| 2010/0220730 A1 * | 9/2010 | Finn et al. | 370/395.1 |
| 2012/0060209 A1 * | 3/2012 | Leu | 726/7 |
| 2013/0024580 A1 * | 1/2013 | Tsai et al. | 709/230 |
| 2013/0114607 A1 * | 5/2013 | McGovern | 370/395.53 |
| 2014/0050077 A1 * | 2/2014 | Kasat et al. | 370/216 |

OTHER PUBLICATIONS

IEEE Std 802.1Q—2011, IEEE Standard for Local and metropolitan area networks, "Media Access Control (MAC) Bridged and Virtual Bridge Local Area Networks," New York, New York, Aug. 31, 2011.

* cited by examiner

*Primary Examiner* — Hicham Foud
(74) *Attorney, Agent, or Firm* — Polsinelli PC (57) ABSTRACT

In particular embodiments, a first switch implementing a first virtual local area network (VLAN) registration protocol and connected to a first end of the trunk detects whether a second switch connected to a second end of the trunk implements the first VLAN registration protocol. In an embodiment, the second switch may send an unsolicited message to the first switch indicating the VLAN registration protocol implemented by the second switch. The first switch may then determine the VLAN registration protocol implemented by the second switch. Alternatively, the first switch may send a solicited message to the second switch. By receiving a response to the solicited message, the first switch can determine that the second switch implements the first VLAN registration protocol. In response to determining that the second switch implements the first VLAN registration protocol, the first switch may enable a pruning technique in accordance with the first VLAN registration protocol.

20 Claims, 9 Drawing Sheets

DETECTING VLAN REGISTRATION PROTOCOL CAPABILITY OF A SWITCH IN A COMPUTER NETWORK

TECHNICAL FIELD

The present disclosure relates generally to computer networks, and, more particularly, to detection of a virtual local area network (VLAN) registration protocol capability of a switch in a computer network.

BACKGROUND

A plurality of virtual local area network (VLAN) registration protocols may be utilized in a network having a first switch coupled to a second switch over a trunk, wherein a first of the VLAN registration protocols may be considered a "defacto" standard for VLAN registration (and pruning) in the network. For VLAN traffic destined for the second switch, the first switch may implement a pruning technique associated with the first VLAN registration protocol. However, if the second switch does not implement the first VLAN registration protocol and instead implements a different, second VLAN registration protocol, the pruning technique implemented by the first switch may incorrectly block (prune) VLAN traffic destined for the second switch. Accordingly, there is a need for a technique to detect whether the second switch implements the first VLAN registration protocol, so that the first switch can determine whether the pruning technique associated with the first VLAN registration protocol should or should not be implemented.

BRIEF DESCRIPTION OF THE DRAWINGS

The embodiments herein may be better understood by referring to the following description in conjunction with the accompanying drawings in which like references numerals indicate identically or functionally similar elements of which.

DESCRIPTION OF EXAMPLE EMBODIMENTS

Overview

Particular embodiments detect virtual local area network (VLAN) registration protocol capability of one or more switches interconnected over, e.g., a trunk in a computer network. Specifically, a first switch implementing a first VLAN registration protocol and connected to a first end of the trunk detects whether a second switch connected to a second end of the trunk implements the first VLAN registration protocol. In an embodiment, the second switch may send an unsolicited message to the first switch indicating the VLAN registration protocol implemented by the second switch. Upon receiving the unsolicited message, the first switch may determine the VLAN registration protocol implemented by the second switch. In an another embodiment, the first switch may send a solicited message to the second switch that solicits the VLAN registration protocol capability of the second switch. By receiving a response to the solicited message from the second switch, the first switch can determine that the second switch implements the first VLAN registration protocol (e.g., Multiple VLAN Registration Protocol (MVRP)). More specifically, in response to determining that the second switch implements the first VLAN registration protocol, the first switch may enable a pruning technique (e.g., MVRP pruning) in accordance with the first VLAN registration protocol. In contrast, upon detecting that the second switch does not implement the first VLAN registration protocol (e.g., the second switch implements a second different VLAN registration protocol), the first switch may ensure that the pruning technique in accordance with the first VLAN registration protocol is not enabled at the first switch and as a result, may forward (flood) traffic associated with all VLANs to the second switch.

Description

A computer network is a geographically distributed collection of entities interconnected by communication links, segments and subnetworks. These entities are typically software programs executing on hardware computer platforms, such as end stations and intermediate stations. An example of an intermediate station may be a device, such as a bridge or a switch, which interconnects the communication links and network segments to enable transmission of data between the end stations. The device logically separates the segments within the network and generally operates at "layer-2" (e.g., data link layer) to transfer frames among entities of the network using Media Access Control (MAC) addresses. Typically, the device (e.g., switch) is a computer comprising a plurality of ports that couple the switch to other network entities (e.g., other switches and/or end stations) over various types of network segments and media, such as Ethernet, fiber (FDDI), trunks, or token ring connections.

Many types of networks are available, with the types ranging from local area networks (LANs) to virtual local area networks (VLANs). As used herein, a VLAN is a logical group of end stations, independent of physical location, that restrain network traffic as a single broadcast domain. That is, only end stations defined as being part of the VLAN receive traffic associated with the VLAN.

Broadly stated, a trunk is a physical link between two entities (e.g., switches), that carries multiple logical links for VLANs associated with VLAN traffic destined for end stations. Traffic belonging to different VLANs may be multiplexed over the trunk. To that end, the switches on either end of the trunk may implement VLAN registration protocols to register and de-register for traffic associated with particular VLANs based on needs of the end stations that are coupled to the ports of the switches. An example of such a registration protocol is the Multiple VLAN Registration Protocol (MVRP), defined in the IEEE 802.1ak Amendment to IEEE 802.1Q-2005. The MVRP protocol is a standards-based Layer 2 network protocol, for automatic configuration of VLAN information on switches. Another example of a VLAN registration protocol developed by Cisco Systems, Inc of San Jose, Calif., is the well-known VLAN Trunk Protocol (VTP) for the automatic configuration of VLAN information on switches.

Figure 1:
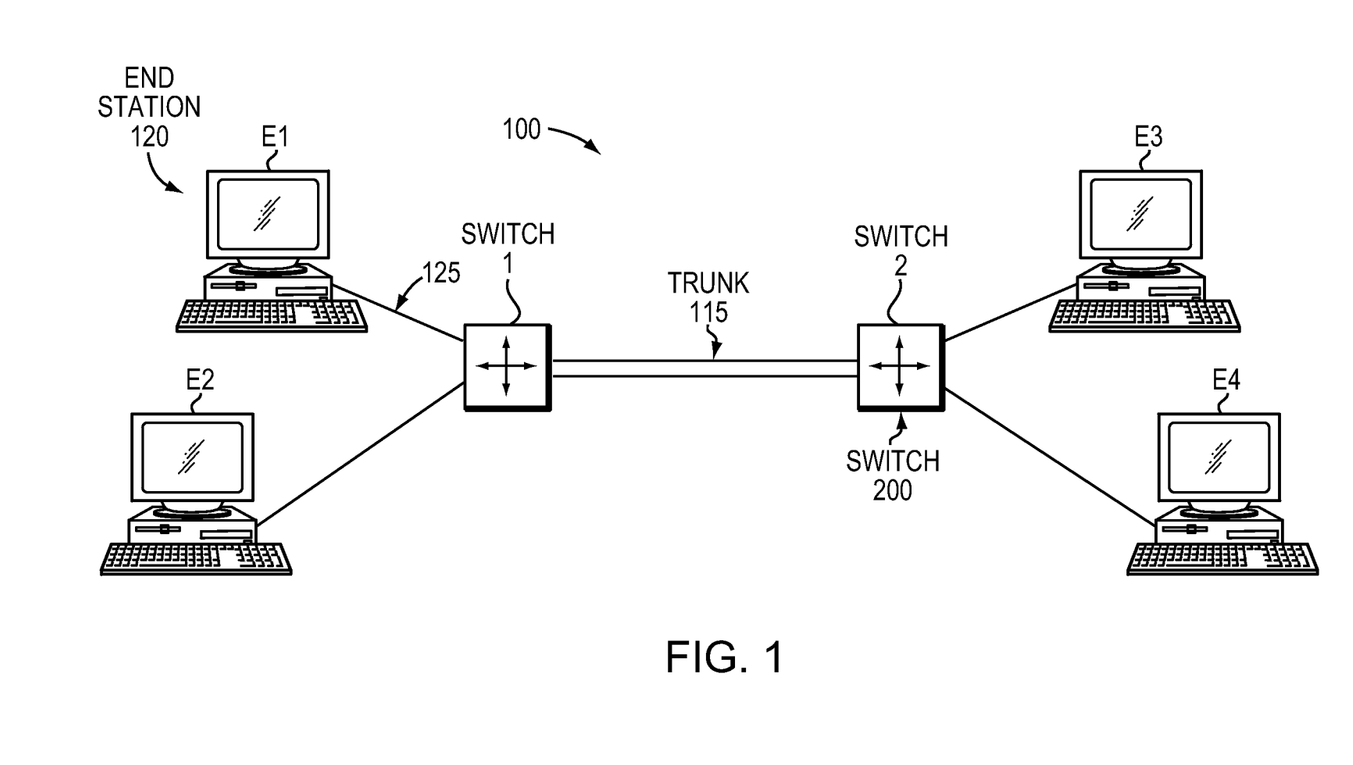
FIG. 1 illustrates an example computer network.

FIG. 1 illustrates an example network 100 illustratively comprising network entities, such as switches 200 (e.g., switch 1 and switch 2) interconnected by trunk 115 and coupled to end stations 120 (e.g., E1-E4) over links 125. Those skilled in the art will understand that any number of entities, end stations, and/or links may be used in the computer network, and that the view shown herein is for simplicity. Those skilled in the art will also understand that while the embodiments described herein are described generally, they may apply to any network configuration within a network, or through multiple networks.

Figure 2:
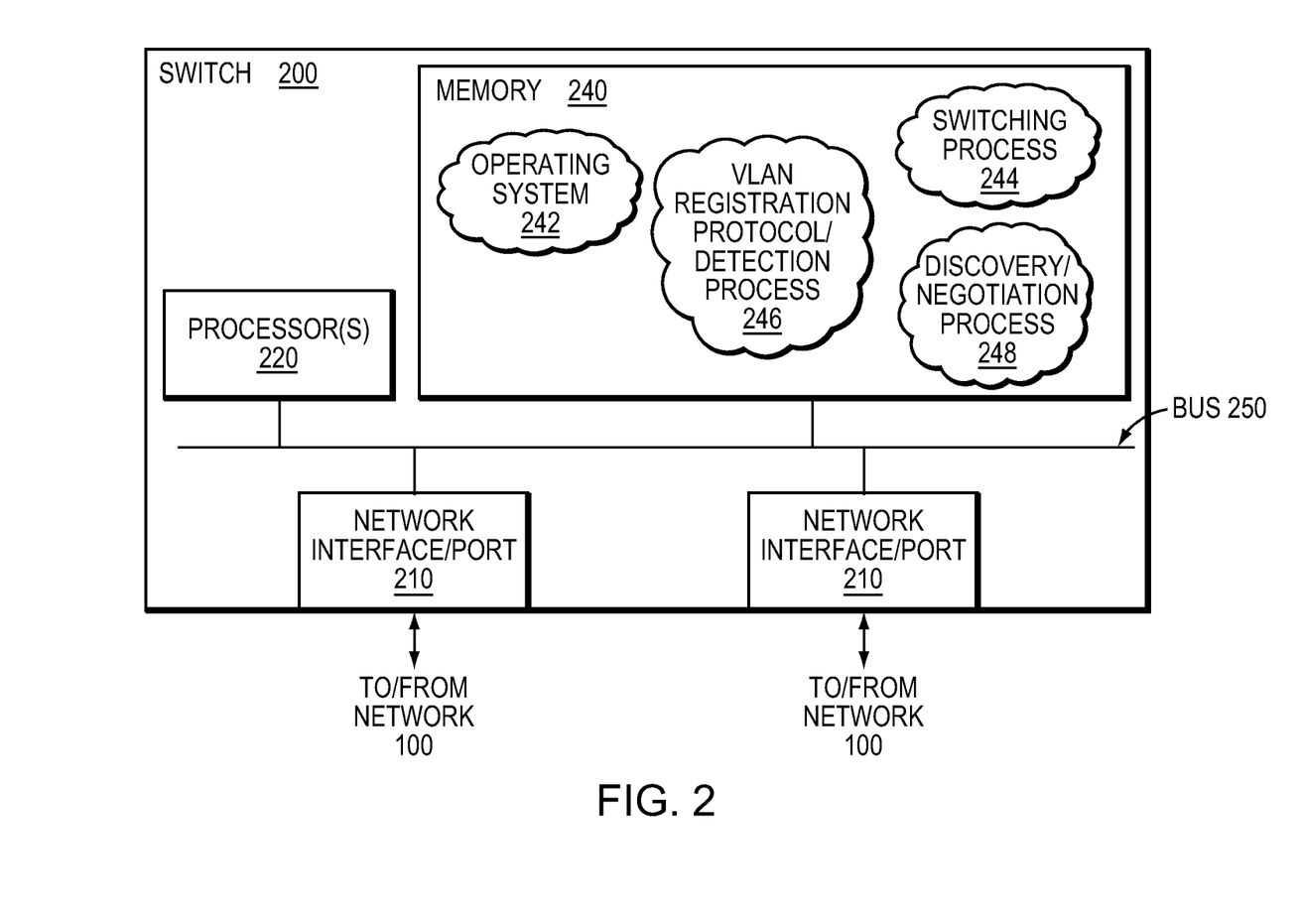
FIG. 2 illustrates an example device.

FIG. 2 illustrates an example switch 200 that may be used with one or more embodiments described herein. Switch 200 includes a plurality of network interfaces/ports 210, one or more processors 220, and a memory 240 interconnected by a system bus 250. The network interfaces/ports 210 contain the mechanical, electrical, and signaling circuitry for communicating data over physical or wireless links coupled to the network 100. The network interfaces/ports 210 may be configured to transmit and/or receive data (frames) using a variety of different communication protocols over the links. For example, such communication protocols may include, inter alia, TCP/IP, UDP, ATM, synchronous optical networks (SONET), VLAN registrations protocols, such as MVRP and VTP, discovery protocols such as the Cisco Discovery Protocol (CDP) and the Link Layer Discovery Protocol (LLDP), and negotiation protocols such as the Dynamic Trunking Protocol (DTP), etc. As described herein, a network interface/port 210 may also be used to implement one or more virtual network interfaces, such as for Virtual Private Network (VPN) access or Virtual LANs (VLANs), as will be understood by those skilled in the art. Furthermore, the network interface/port 210 of switch 200 that faces a neighboring switch, via trunk 115, allows switch 200 to exchange VLAN configuration information utilizing one of a plurality of VLAN registration protocols, such as MVRP or VTP.

The memory 240 comprises a plurality of storage locations that are addressable by the processor(s) 220 and the network interfaces/ports 210 for storing software programs and data structures associated with the embodiments described herein. The processors 220 may comprise necessary elements or logic adapted to execute the software programs and manipulate the data structures. An operating system 242 (e.g., the Internetworking Operating System, or IOS™, of Cisco Systems, Inc.), portions of which are typically resident in memory 240 and executed by the processor(s), functionally organizes the switch by, inter alia, invoking network operations in support of software processes and/or services executing on the switch. These software processes and/or services may comprise an illustratively simplified switching process 244, along with an illustrative VLAN registration protocol/detection process 246, and illustrative discovery/negotiation protocol 248. It will be apparent to those skilled in the art that other types of processors and memory, including various computer-readable media, may be used to store and execute program instructions pertaining to the embodiment described herein.

Switching process 244 contains computer executable instructions executed by the processor(s) 220 to perform various functions relating to switches in general, as may be appreciated by those skilled in the art. For instance, these functions may be configured to manage switching databases (e.g., spanning tree instances), link state databases (LSDBs), filtering databases (FDBs), or forwarding information databases (FIBs) containing, e.g., data used to make switching/forwarding decisions. Further, the switching process 244 may perform other functions associated with switches, as known by those skilled in the art (e.g., spanning tree protocol).

VLAN registration protocol/detection process 246 contains computer executable instructions executed by processor(s) 220 to perform functions associated with the VLAN registration protocol(s) implemented by the switch (e.g., MVRP and VTP), as well as functions associated with detecting the VLAN registration protocol implemented by a neighboring switch. Further, the VLAN registration protocol/detection process 246 may also enable a pruning technique associated with the VLAN registration protocol implemented by the switch. For instance, when a switch enables MVRP pruning, the switch can block (prune) particular VLAN traffic so that the particular VLAN traffic is not sent over a trunk to the neighboring switch.

Discovery/negotiation protocol 248 contains computer executable instructions executed by processor(s) 220 to perform functions associated discovery protocol(s) and negotiation protocol(s) implemented by the switch (e.g., CDP, LLDP, and DT).

Referring again to FIG. 1, switch 1 may be active (present) in network 100 and may implement a first VLAN registration protocol (e.g., MVRP) in network 100 that contains VLANs 1-4. As known by those skilled in the art, the switch 1 may indicate, to switch 2, its presence by sending heartbeat messages, hello messages, or any other type of "presence" message over trunk 115 to switch 2 that also implements MVRP. In general, a MVRP switch, on behalf of the end stations 120 coupled to the MVRP switch, may send negotiation messages to other switches in the network indicating the particular VLAN traffic that the end stations would like to receive (i.e., after becoming aware of the presence of the other switches). In accordance with the MVRP protocol and as known by those skilled in the art, MVRP capable switches send and receive first negotiation messages indicating the VLAN traffic that the MVRP switches are interested in receiving. For example, if end stations E3 and E4, coupled to switch 2, are interested in receiving no traffic associated with VLANs 1-4, switch 2 would not send any negotiation messages to switch 1. Thus, in response to receiving no negotiation messages from switch 2, switch 1 may conclude that switch 2 is not interested in receiving VLAN traffic associated with VLANs 1-4. Switch 1 may then enable MVRP pruning at switch 1 and "prune" VLAN traffic over trunk 115 associated with VLANs 1-4.

Alternatively, assume switch 2 is configured to implement a second VLAN registration protocol, such as VTP, while switch 1 is configured to implement the first VLAN registration protocol, e.g., MVRP. As known by those skilled in the art, MVRP is a "defacto" protocol for layer-2 networks that implement VLAN registration protocols. As such, switch 1 may assume that switch 2 (which is connected to the other end of trunk 115) is MVRP enabled, which it is not (i.e., switch 2 is VTP enabled). Further, in accordance with the VTP protocol and as known by those skilled in the art, VTP switches send and receive second negotiation messages indicating the VLAN traffic that the VTP switches are not interested in receiving. Thus, the VTP protocol may be implemented in a conflicting manner when compared to that of the MVRP protocol. Specifically, VTP switches send second negotiation messages associated with VLAN traffic that are not of interest, while MVRP switches send first negotiation messages associated with VLAN traffic that are of interest. According to the VTP protocol, if end stations E3 and E4, which are coupled to switch 2, are interested in receiving traffic associated with VLANs 1-4, switch 2 would send no messages to switch 1. Thus, in a network environment implementing both MVRP and VTP, switch 1 (which receives no negotiation message from switch 2) will not be able to discern whether switch 2 is a MVRP switch that is not interested in receiving traffic associated with any of the VLANs, or whether switch 2 is a VTP switch that is interested in receiving traffic associated with all the VLANs.

If switch 1 assumes that switch 2 is MVRP enabled because e.g., MVRP is the "defacto" protocol, switch 1 would therefore incorrectly determine that switch 2 is not interested in receiving traffic associated with any VLANs and would incorrectly prune all traffic associated with VLANs 1-4. Accordingly, it would be desirable to allow switch 1 (e.g., that is MVRP enabled) to effectively determine whether switch 2 also implements the first VLAN registration protocol (e.g., MVRP), so that switch 1 can correctly enable (or not enable) a pruning technique associated with the first VLAN registration protocol (e.g., MVRP).

VLAN Registration Protocol Capability/Detection:

Particular embodiments detect a VLAN registration protocol capability of one or more switches interconnected over, e.g., a trunk in a computer network. Specifically, a first switch implementing a first VLAN registration protocol and connected to a first end of the trunk detects whether a second switch connected to a second end of the trunk implements the first VLAN registration protocol. In an embodiment, the second switch may send an unsolicited message to the first switch indicating the VLAN registration protocol implemented by the second switch. Upon receiving the unsolicited message, the first switch may determine the VLAN registration protocol implemented by the second switch. In another embodiment, the first switch may send a solicited message to the second switch that solicits the VLAN registration protocol capability of the second switch. By receiving a response to the solicited message from the second switch, the first switch can determine that the second switch implements the first VLAN registration protocol (e.g., Multiple VLAN Registration Protocol (MVRP)). More specifically, in response to determining that the second switch implements the first VLAN registration protocol, the first switch may enable a pruning technique (e.g., MVRP pruning) in accordance with the first VLAN registration protocol. In contrast, upon detecting that the second switch does not implement the first VLAN registration protocol (e.g., the second switch implements a second different VLAN registration protocol), the first switch may ensure that the pruning technique in accordance with the first VLAN registration protocol is not enabled at the first switch and as a result, flood traffic associated with all VLANs to the second switch.

Unsolicited Messages:

FIGS. 3-6 illustrate various example unsolicited messages that one switch may send over a trunk to another switch to determine the VLAN registration protocol capability of the another switch.

Figure 3:
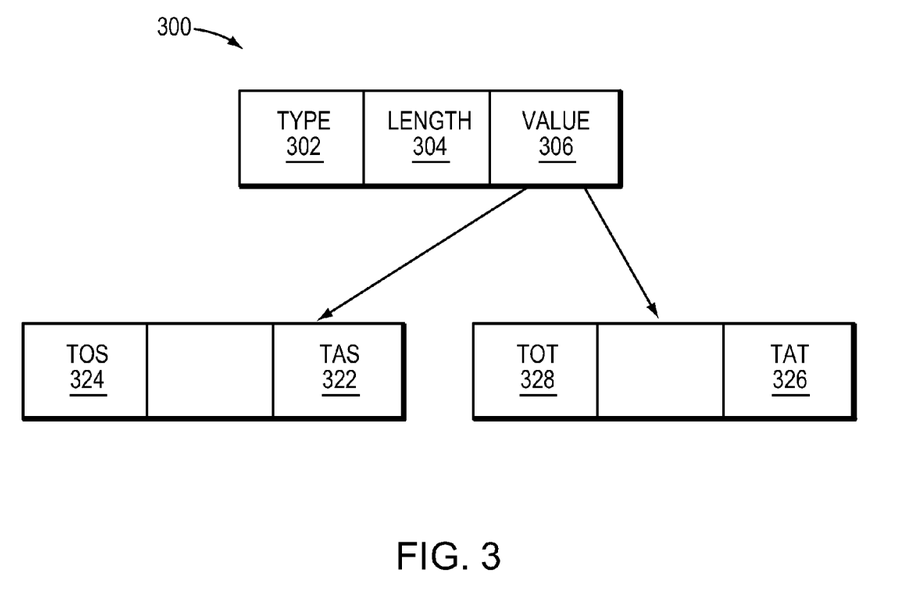
FIG. 3 illustrates an example unsolicited (Dynamic Trunking Protocol) message.

FIG. 3 is an example DTP message 300 that may be sent from switch 2, periodically (e.g., at specific time intervals), over trunk 115 to switch 1 indicating that switch 2 implements the first VLAN registration protocol (e.g., MVRP). The DTP message 300 illustratively embodies a conventional type/length/value (TLV) format wherein the type (T) field 302 includes contents identifying the type of information, the length (L) field 304 includes contents specifying the length of the packet, and the value (V) field 306 includes contents indicating the VLAN registration protocol capability of switch 2. Specifically, switch 2 may send DTP message 300 over trunk 115 with specific values in the V field 406, as detailed below, to indicate that switch 2 implements the first VLAN registration protocol.

For example, the V field 306 may contain a trunk administration status (TAS) field 322 and a trunk operational status (TOS) information field 324. The TAS field 322 is a 3-bit field whose contents specify the trunk administration status mode of a port over which switch 2 sends the DTP packet. Illustratively, the port may be configured to a status mode of on; off; desirable; or auto. In an embodiment, the bits of TAS subfield may be configured to 011 (i.e., desirable mode) to indicate that switch 2 implements the first VLAN registration protocol.

The TOS field 324 is a 1-bit field that typically specifies a present operational trunk status of the port. The operational status bit may be set to 0 for access (NT) or 1 for trunk (T). In an embodiment, the bit of the TOS subfield 324 may be set to 1 to indicate that switch 2 implements the first VLAN registration protocol.

The value field 306 may also contain a trunk administration encapsulation type (TAT) field 326 and a trunk operational encapsulation type (TOT) field 328. The TAT subfield 326 is a 3-bit field whose contents specify the trunk administration encapsulation type of the port. In an embodiment, the 3 bits of TAT field 326 may be configured to 000 (i.e., negotiate) to indicate that switch 2 implements the first VLAN registration protocol.

The TOT subfield 328 is a 3-bit field that specifies the present operational encapsulation type of the port, except when the port is in DTP negotiation, at which point the subfield specifies a trunk-status-to-be for the port. In an embodiment, the port illustratively is in DTP negotiation, as described above with reference to TAT subfield 326, and therefore the 3 bits of TOT field 328 may be configured to 011 to indicate that switch 2 implements the first VLAN registration protocol.

Upon receiving the DTP message 300 over trunk 115 from switch 2, switch 1 may examine the modified TLV of DTP message 300, and specifically TOT subfield 328, and determine that switch 2 implements the first VLAN registration protocol. Thereafter, switch 1 may implement the pruning technique in accordance with the first VLAN registration protocol, and may prune certain VLAN traffic so that it is not sent to switch 2. If it does not receive the DTP message 300 from switch 2, switch 1 does not implement the pruning technique in accordance with the first VLAN registration protocol and accordingly, may flood traffic associated with all VLANs to switch 2 over the trunk.

Figure 4:
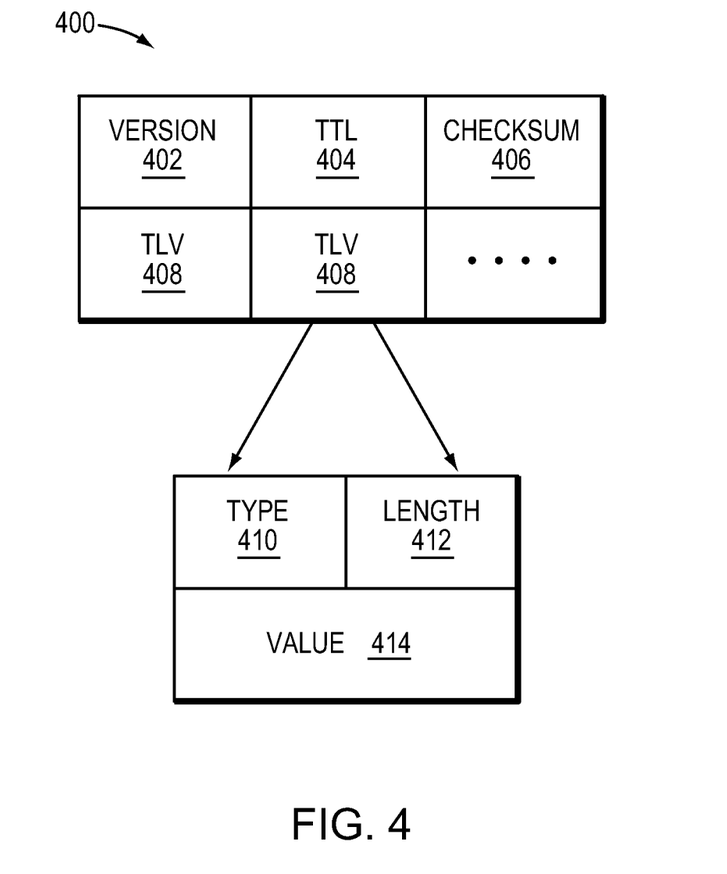
FIG. 4 illustrates an example unsolicited (Cisco Discovery Protocol) message.

FIG. 4 is an example CDP message 400 that may be sent from switch 2, periodically (e.g., at specific time intervals), over trunk 115 to switch 1 indicating that switch 2 implements the first VLAN registration protocol. CDP message 400 illustratively includes a version field 402, time-to-live (TTL) field 404, checksum field 406 and one or more TLVs 408. The version field 402 identifies the version of the CDP message 400. For example, CPD message 400 may include a value (e.g., 0x01) indicating that CDP message 400 is a CDP version 1 message, or a value (e.g., 0x02) indicating that CDP message 400 is a CDP version 2 message. The time-to-live-field 404 includes a value indicating a length of time (e.g., seconds) a receiver, such as switch 1, should keep the information that is contained in the message 400. The checksum field 406 may be utilized to ensure the integrity of message 400, as known by those skilled in the art.

TLV field 408 includes a 16 bit T field 410 that may identify the type of information contained in message 400. In an embodiment, the CPD message 400 is a hello message indicated by a T value of 0x0008 when switch 2 intends to indicate that switch 2 implements the first VLAN registration protocol. Further, a 16 bit L field 412 may indicate the length in bytes of the T, L, and V fields. Moreover, a V field 414 includes a value indicating an EtherType associated with the first VLAN registration protocol. For example, if the first VLAN registration protocol is MVRP, V field 414 may include a value of 0x88F5 (e.g., Subnetwork Access Protocol (SNAP) encoding).

Upon receiving the CDP message 400 over trunk 115 from switch 2, switch 1 may examine the modified TLV of CDP message 400 and, specifically, V field 414, and determine that switch 2 implements the first VLAN registration protocol. Thereafter, switch 1 may implement the pruning technique in accordance with the first VLAN registration protocol, and may prune certain VLAN traffic so that it is not sent to switch 2. If it does not receive the CDP message 400 from switch 2, switch 1 may not implement the pruning technique in accordance with the first VLAN registration protocol and accordingly, may flood traffic associated with all VLANs to switch 2 over the trunk.

Figure 5:
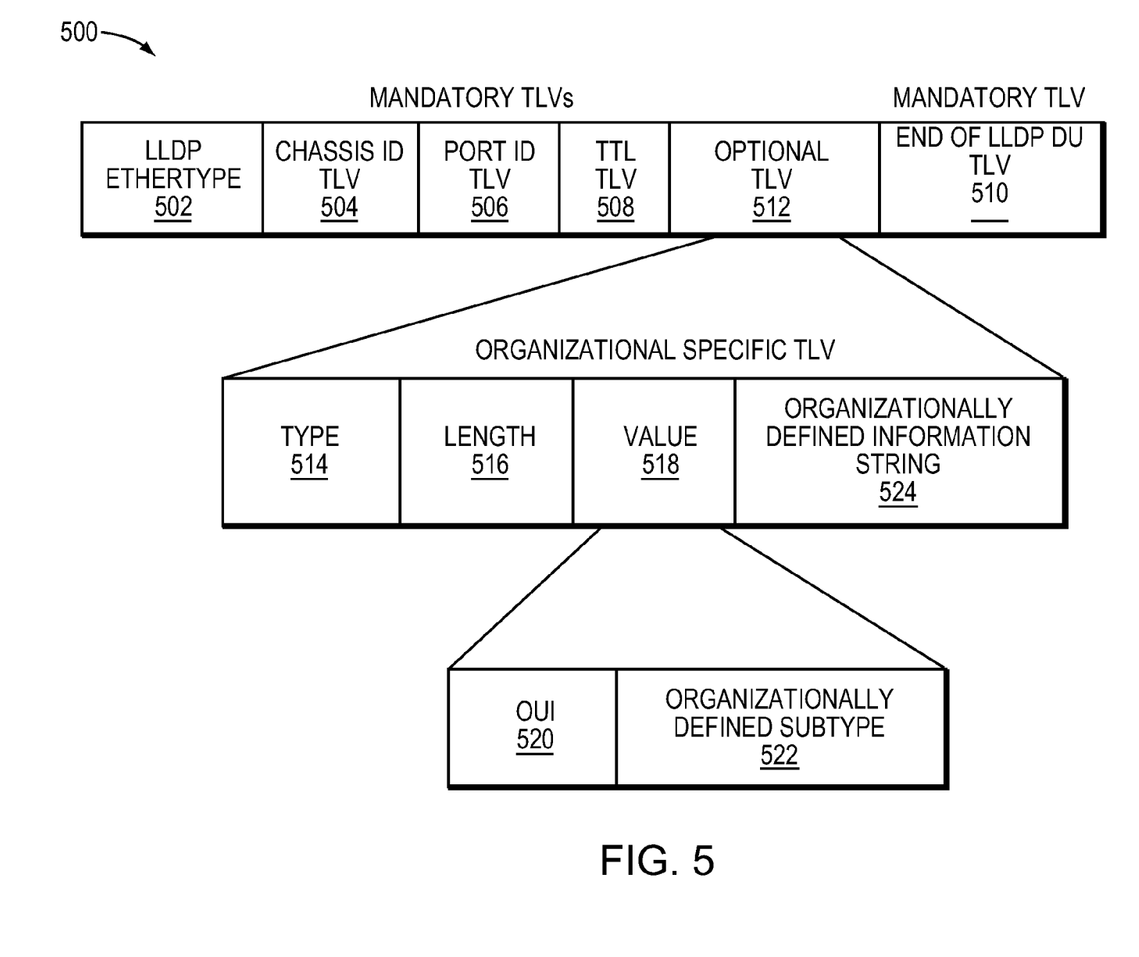
FIG. 5 illustrates an example unsolicited (Link Layer Discovery Protocol) message.

FIG. 5 is an example LLDP message 500 that may be sent from switch 2, periodically (e.g., at specific time intervals), over trunk 115 to switch 1 indicating that switch 2 implements the first VLAN registration protocol. LLDP message 500 illustratively includes a LLDP ethertype field 502 and 4 mandatory TLVs: a chassis ID TLV 504, a Port ID TLV 506, a TTL TLV 508, and an end of LLDP data unit (DU) TLV 510, as known by those skilled in the art. Moreover, LLDP message 500 includes an optional TLV 512 that may be utilized to indicate the VLAN registration protocol capability of a switch.

Specifically, the optional TLV 512 may include an organizational specific TLV having a T field 514 that indicates the type of information (e.g., a value from 1-27). Moreover, a L field 516 may indicate the length in bytes of the T, L, and value fields of the optional TLV field 512. A V 518 illustratively includes a 25-bit organizationally unique identifier (OUI) field 520. In an embodiment, the OUI field 520 may include a value of 00C, specifying the LLDP protocol, to indicate that switch 2 implements the first VLAN registration protocol. Further, the V field 518 may include an 8-bit organizationally defined subtype field 522 that illustratively contains a subtype 04 as a protocol identity to indicate that switch 2 implements the first VLAN registration protocol. Further, the V field 518 may also include an organizationally defined information string field 524 that contains a value indicating the ethertype associated with the first VLAN registration protocol. For example, if the first VLAN registration protocol is MVRP, organizationally defined information string field 524 may include a value of 0x88F5 (e.g., Subnetwork Access Protocol (SNAP) encoding).

Upon receiving the LLDP message 500 over trunk 115 from switch 2, switch 1 may examine the modified TLV of LLDP message 500, and specifically organizationally defined information string field 524, and determine that switch 2 implements the first VLAN registration protocol. Thereafter, switch 1 may implement the pruning technique in accordance with the first VLAN registration protocol, and may prune certain VLAN traffic so that it is not sent to switch 2. If it does not receive the LLDP message 500 from switch 2, switch 1 may not implement the pruning technique in accordance with the first VLAN registration protocol and accordingly, may flood traffic associated with all VLANs to switch 2 over the trunk.

Figure 6:
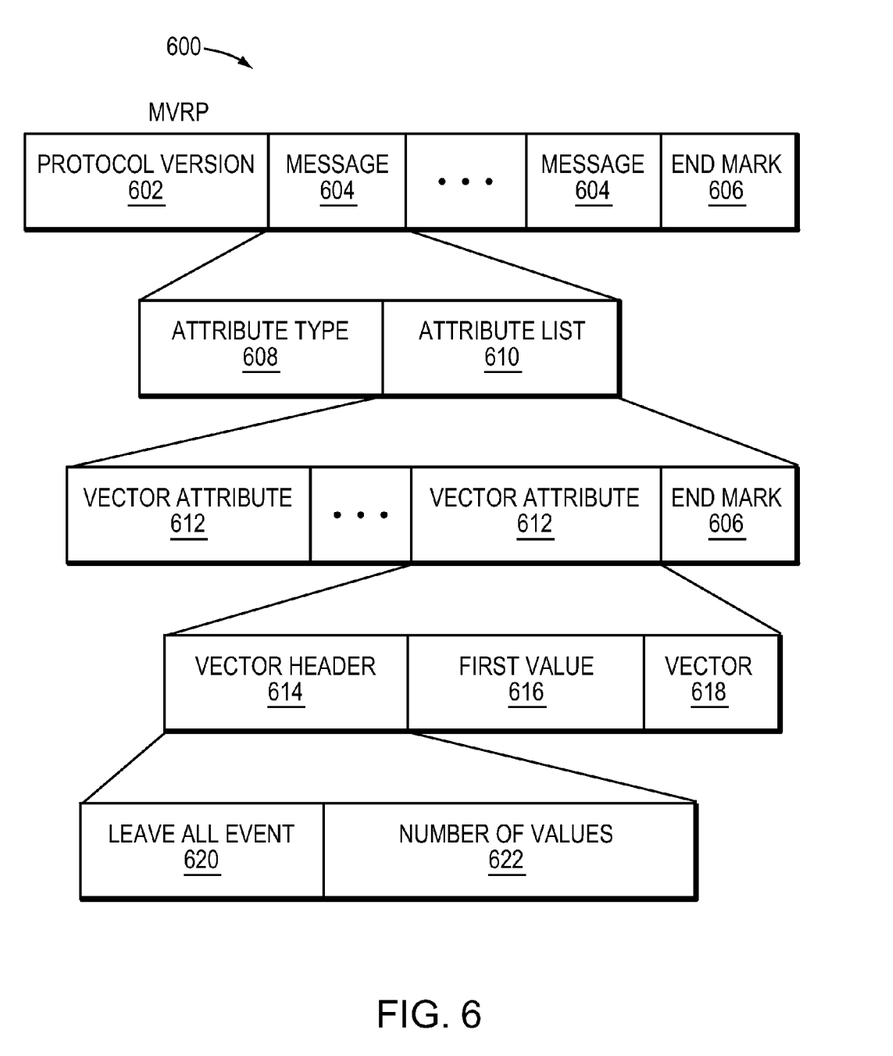
FIG. 6 illustrates an example unsolicited (Multiple VLAN Registration Protocol (MVRP)) message.

FIG. 6 is an example MVRP message 600 may be sent from switch 2, periodically (e.g., at specific time intervals), over trunk 115 to switch 1 indicating that switch 2 implements the first VLAN registration protocol. MVRP message 600 illustratively includes a protocol version field 602 (e.g., specifying the version of the MVRP protocol), one or more message fields 604, and an end mark field 606. Each message field 604 includes an attribute type field 608 and an attribute list field 610, where each attribute list field 610 includes one or more vector attribute fields 612 and the end mark field 606.

Moreover, each vector attribute field 612 includes a vector header field 614, a first value field 616, and a vector field 618. The vector header field 614 includes a leave all event field 620 and a number of values field 622. As known by those skilled in the art, the leave all events field 620 illustratively includes 3 bits, where a bit is utilized for a "leave all" indication. In an embodiment, 1 of the remaining 2 bits in the leave all events field 620 may be utilized to indicate that switch 2 implements the first VLAN registration protocol. For example, if the first VLAN registration protocol is MVRP, 1 of the remaining 2 bits may be set to "1" or "0."

Upon receiving the MVRP message 600 over trunk 115 from switch 2, switch 1 may examine the leave all events field 620 and determine that switch 2 implements the first VLAN registration protocol. Thereafter, switch 1 may implement the pruning technique in accordance with the first VLAN registration protocol, and may prune certain VLAN traffic so that it is not sent to switch 2. If it does not receive the MVRP message 600 from switch 2, switch 1 may not implement the pruning technique in accordance with the first VLAN registration protocol and accordingly, may flood traffic associated with all VLANs to switch 2 over the trunk.

Figure 7:
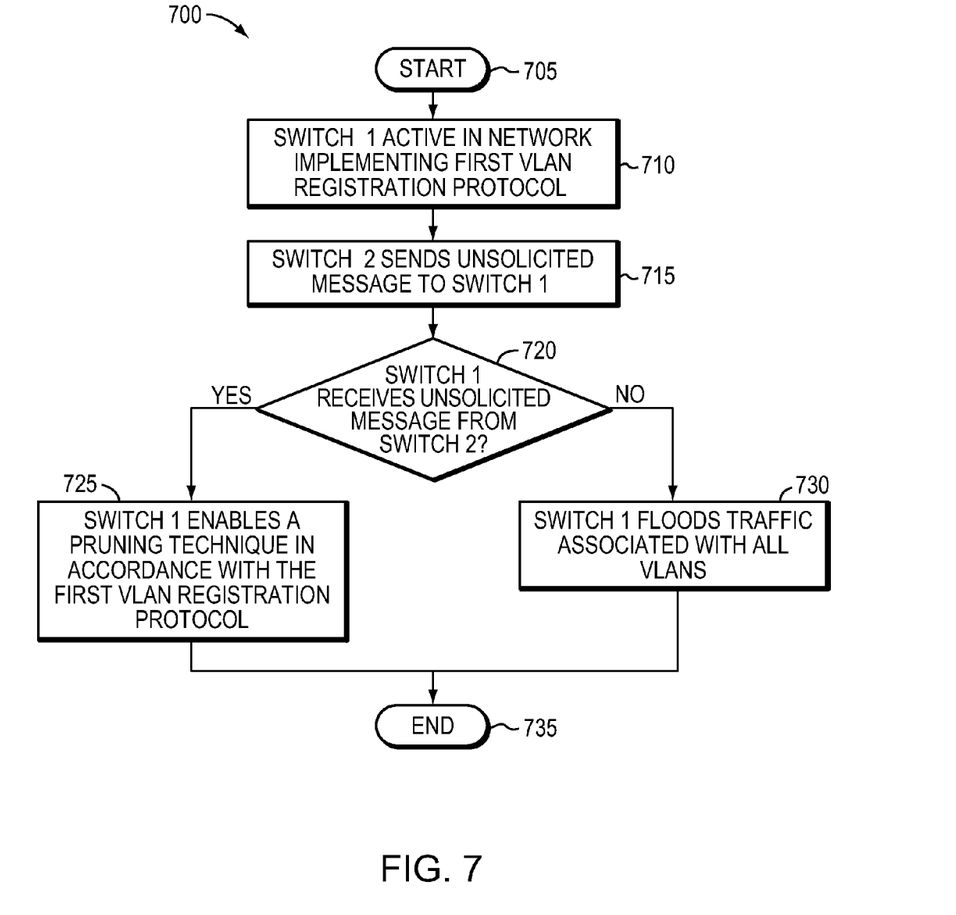
FIG. 7 illustrates an example simplified procedure for determining the virtual local area network (VLAN) registration protocol capability of a switch in a network utilizing an unsolicited message.

FIG. 7 is an example procedure for detecting the VLAN registration protocol capability of a switch in a network implementing at least two VLAN registration protocols. The procedure 700 starts at step 705 and continues to step 710 where a first switch may be active (present) in the network and may implement a first VLAN registration protocol. As known by those skilled in the art, the first switch may indicate, to a second switch in the network, its presence by sending heartbeat messages, hello messages, or any other type of "presence" message over a trunk that couples the first switch to the second switch. Upon becoming aware of the presence of the first switch, the second switch may send, at step 715, an unsolicited message to the first switch indicating the VLAN registration protocol implemented by the second switch. At step 720, the first switch determines whether the unsolicited message is received from the second switch, and thus whether the second switch implements the first VLAN registration protocol. In response to receiving the unsolicited message and determining that the second switch implements the first VLAN registration protocol (e.g., MVRP), the first switch may implement a pruning technique (e.g., MVRP pruning) in accordance with the first VLAN registration protocol at step 725. However, if it does not receive the unsolicited message and determines that the second switch does not implement the first VLAN registration protocol, the first switch may not implement the pruning technique in accordance with the first VLAN registration protocol, and at step 730 may flood traffic associated with all VLANs over the trunk to the second switch. The procedure ends at step 735.

Figure 8:
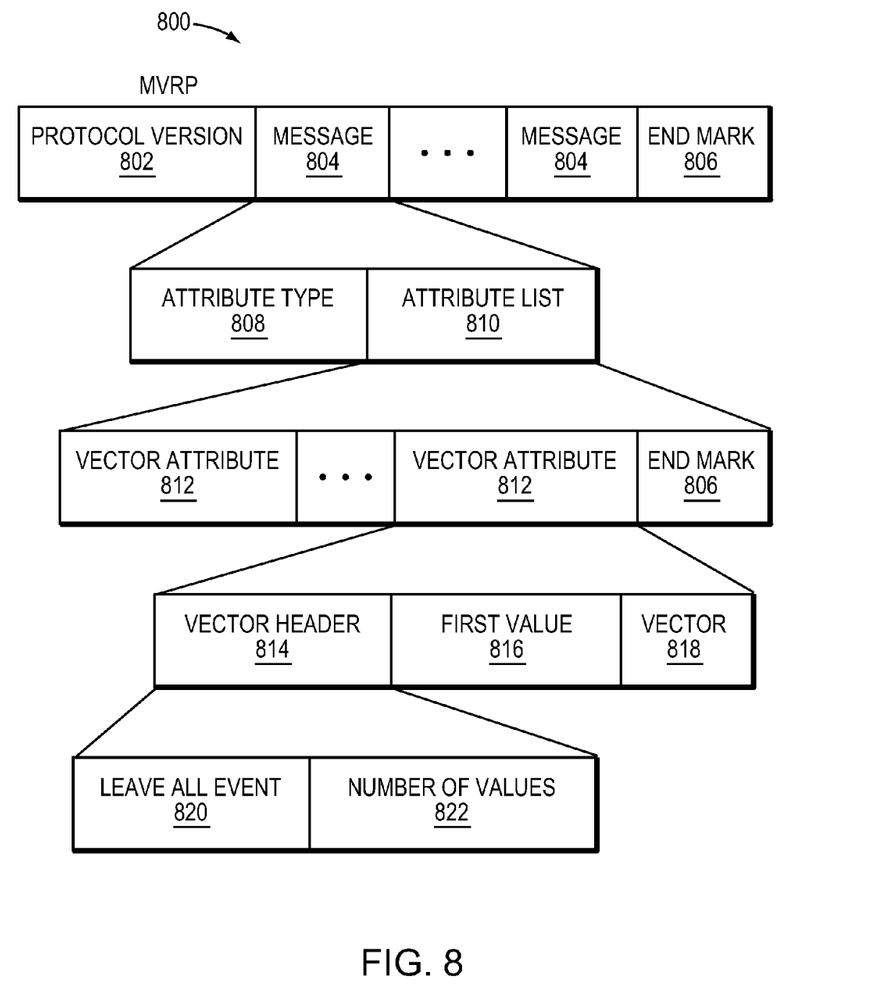
FIG. 8 illustrates an example solicited (MVRP) message.

Solicited Message:

FIG. 8 illustrates an example solicited message that one switch may send over the trunk to another switch that solicits the VLAN registration protocol capability of the another switch.

FIG. 8 is an example MVRP message 800 may be sent from switch 1, periodically (e.g., at specific time intervals), over trunk 115 to switch 2 that solicits the VLAN registration protocol capability of switch 2. MVRP message 800 illustratively includes protocol version field 802 (e.g., specifying the version of the MVRP protocol), one or more message fields 804, and an end mark field 806. Each message field 804 includes an attribute type field 808 and an attribute list field 810, where each attribute list field 810 includes one or more vector attribute fields 812, and the end mark field 806.

Moreover, each vector attribute field 812 includes a vector header field 814, a first value field 816, and a vector field 818. The vector header field 814 includes a leave all event field 820 and a number of values field 822. As known by those skilled in the art, the leave all events field 820 illustratively includes 3-bits, where a bit is utilized for a "leave all" indication. In an embodiment, 1 of the remaining 2 bits in the leave all events field 820 may be asserted by the switch 1 and utilized in conjunction with a MVRP capability timer, as known by those skilled in the art. Specifically, switch 1 may send the MVRP message 800 and assert 1 of the remaining 2 bits in the leave all events field and set the MVRP capability timer to a specific value.

Upon receiving a response from switch 2 before the MVRP capability timer expires, switch 1 may implement the pruning technique in accordance with the first VLAN registration protocol, and may prune certain VLAN traffic so that it is not sent to switch 2. If a response is not received from switch 2 before the MVRP capability timer expires, switch 1 may not implement the pruning technique in accordance with the first VLAN registration protocol and accordingly, may flood traffic associated with all VLANs to switch 2 over the trunk.

In an embodiment, switch 1 may send a MVRP message 800, over trunk 115 to switch 2 with the 1 bit asserted for the leave all indication in the leave all events field 820. Upon receiving a join message from switch 2, as known by those skilled in the art, switch 1 may implement the pruning technique in accordance with the VLAN registration protocol (e.g., MVRP), and may prune certain VLAN traffic so that it is not sent to switch 2. However, if it does not receive the join message, switch 1 may not implement the pruning technique in accordance with the first VLAN registration protocol accordingly, may flood traffic associated with all VLANs to switch 2 over the trunk.

In an embodiment, switch 1 may send the MVRP message 800, over trunk 115 to switch 2, requesting that switch 1 receive traffic associated with one or more VLANs. Upon receiving an acknowledgement message, or another type of response message from switch 2, switch 1 may determine that switch 2 implements the first VLAN registration protocol and may implement the pruning technique in accordance with the first VLAN registration protocol, and may prune certain VLAN traffic so that it is not sent to switch 2. However if it does not receive the acknowledgment message or the response message from switch 2, switch 1 may not implement the pruning technique in accordance with the first VLAN registration protocol, and accordingly, may flood traffic associated with all VLANs to switch 2 over the trunk.

Figure 9:
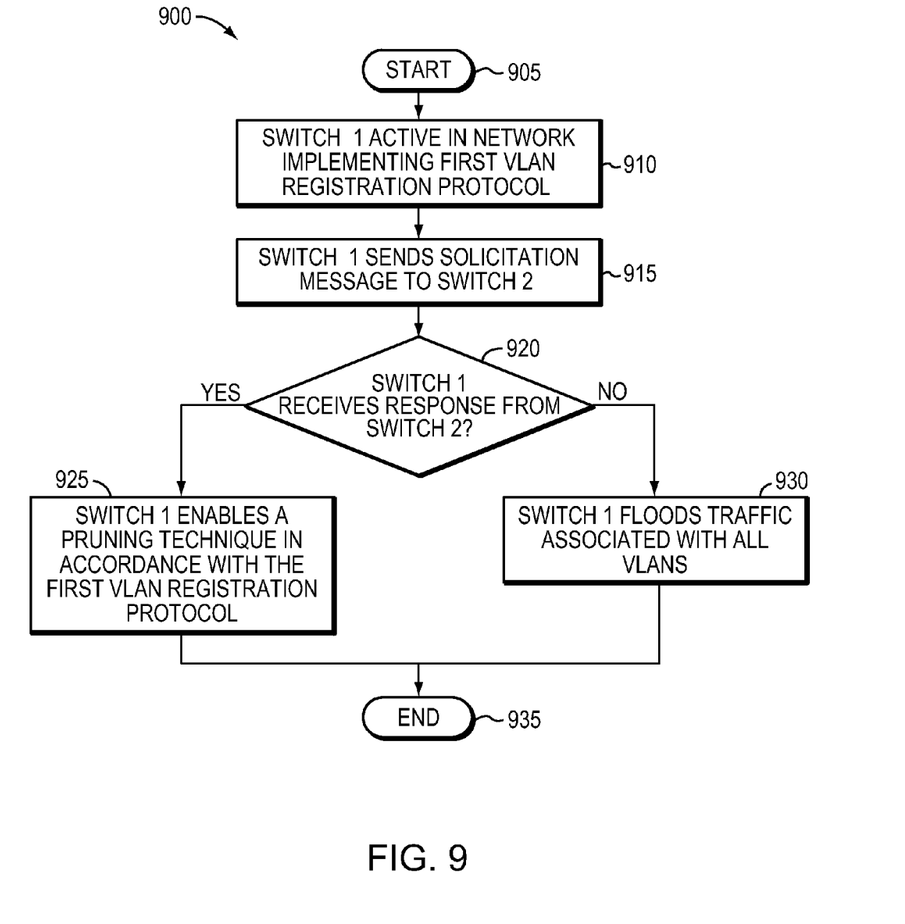
FIG. 9 illustrates an example simplified procedure for determining the VLAN registration protocol capability of a switch in a network utilizing a solicited message.

FIG. 9 is an example procedure for detecting the VLAN registration protocol capability of a switch in a network implementing at least two VLAN registration protocols. The procedure 900 starts at step 905 and continues to step 910 where a first switch may be active (present) in the network and may implement a first VLAN registration protocol. As known by those skilled in the art, the first switch may indicate, to a second switch in the network, its presence by sending heartbeat messages, hello messages, or any other type of "presence" message over a trunk that couples the first switch to the second switch. At step 915, the first switch may send a solicitation message to the second switch that solicits the VLAN registration protocol capability of the second switch. At step 920, the first switch determines whether a response to the solicitation message is received from the second switch. Upon receiving the response, and thus determining that the second switch implements the first VLAN registration protocol (e.g., MVRP), the first switch may implement the pruning technique (e.g., MVRP pruning) in accordance with the first VLAN registration protocol at step 925. However, if it does not receive the response and thus does not determine that the second switch implements the first VLAN registration protocol, the first switch may not implement the pruning technique in accordance with the first VLAN registration protocol, and at step 930 may flood traffic associated with all VLANs over the trunk to the second switch. The procedure ends at step 935.

Advantageously, the first switch can detect whether the second switch implements the first VLAN registration protocol, so that the first switch can determine whether the pruning technique associated with the first VLAN registration protocol should or should not be implemented.

The foregoing description has been directed to specific embodiments. It will be apparent, however, that other variations and modifications may be made to the described embodiments, with the attainment of some or all of their advantages. For instance, it is expressly contemplated that the first VLAN registration protocol may be any VLAN registration protocol, and the description above of MVRP being the first VLAN registration protocol is simply exemplarily in nature. Further, the components and/or elements described herein can be implemented as software encoded on one or more tangible (non-transitory) computer-readable storage media (e.g., disks/CDs/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A system, comprising:
   a first device coupled to a second device over a trunk in a computer network configured to implement at least two virtual local area network (VLAN) registration protocols, wherein the first device implements a first VLAN registration protocol;
   the first device configured to detect whether the second device implements the first VLAN registration protocol based on an unsolicited message received by the first device from the second device, the unsolicited message including a modified type/length/value (TLV) and a trunk operational encapsulation type (TOT) field, the modified TLV and the TOT field indicating a second VLAN registration protocol implemented on the second device; and
   in response to determining that the second VLAN registration protocol is the same as the first VLAN registration protocol, the first device further configured to implement a pruning technique associated with the first VLAN registration protocol for VLAN traffic forwarded to the second device.

2. The system of claim 1, wherein the first device is a switch and the second device is a switch or an End Host capable of VLAN trunks.

3. The system of claim 1, wherein the first VLAN registration protocol is a multiple VLAN registration protocol (MVRP).

4. The system of claim 1, wherein the first device further configured to disable the pruning technique associated with the first VLAN registration protocol at the first device for all the VLAN traffic over the trunk to the second device-in response to determining that the second VLAN registration protocol is different from the first VLAN registration protocol.

5. The system of claim 4, wherein the second device implements a VLAN trunking protocol (VTP).

6. The system of claim 1 wherein, in response to not receiving the unsolicited message from the second device, the first device further configured to send a solicitation message to the second device to solicit a VLAN registration protocol capability of the second device.

7. The system of claim 6, wherein the solicitation message is a multiple VLAN registration protocol (MVRP) message.

8. The system of claim 6, where the solicitation message is a MVRP join message.

9. The system of claim 6, wherein content of the solicitation message indicates that the second device implements the first VLAN registration protocol.

10. The system of claim 9, wherein the unsolicited message is one of a Dynamic Trunking Protocol (DTP) message.

11. A method, comprising:
implementing a first virtual local area network (VLAN) registration protocol at a first device in a computer network configured to implement at least two VLAN registration protocols, wherein the first device is coupled to a second device over a trunk;
determining, by the first device, that the second device implements the first VLAN registration protocol based upon an unsolicited message from the second device, the unsolicited message including a modified type/length/value (TLV) and a trunk operational encapsulation type (TOT) field, the modified TLV and the TOT field indicating a second VLAN registration protocol implemented on the second device; and
in response to determining that the second VLAN registration protocol is the same as the first VLAN registration protocol, enabling, by the first device, a pruning technique associated with the first VLAN registration protocol for VLAN traffic forwarded to the second device.

12. The method of claim 11, wherein the first VLAN registration protocol is a multiple VLAN registration protocol (MVRP).

13. The method of claim 11, further comprising:
in response to determining that the second VLAN registration protocol is different from the first VLAN registration protocol, disabling the pruning technique associated with the first VLAN registration protocol at the first device.

14. The method of claim 13, wherein the second device implements a second VLAN registration protocol that is a VLAN trunking protocol (VTP).

15. The method of claim11, further comprising:
in response to not receiving the unsolicited message from the second device, sending, by the first device, a solicitation message to the second device to solicit a VLAN registration protocol capability of the second device.

16. A device, comprising:
a port configured to receive one or more unsolicited messages from a second device over a trunk, wherein the device implements a first virtual local area network (VLAN) registration protocol in a computer network configured to implement at least two VLAN registration protocols; and
a processor coupled to the port and configured to:
detect that the second device implements the first VLAN registration protocol based on the received one or more unsolicited messages, each of the one or more unsolicited message including a modified type/length/value (TLV) and a trunk operational encapsulation type (TOT) field, the modified TLV and the TOT field indicating a second VLAN registration protocol implemented on the second device;
in response to determining that the second VLAN registration protocol is the same as the first VLAN registration protocol, implement a pruning technique in accordance with the first VLAN registration protocol for VLAN traffic forwarded to the second device.

17. The device of claim 16, wherein the first VLAN registration protocol is a multiple VLAN registration protocol (MVRP).

18. The device of claim 16, wherein the processor is further configured to determine that the second device does not implement the first VLAN registration protocol based on the one or more unsolicited messages from the second device.

19. The device of claim 16, wherein the processor is further configured to disable the pruning technique associated with the first VLAN registration protocol at the first device for all the VLAN traffic over the trunk to the second device in response to determining that the second VLAN registration protocol is different from the first VLAN registration protocol.

20. The method of claim 15, wherein the solicitation message is a multiple VLAN registration protocol (MVRP) message.

* * * * *